(12) United States Patent
MacKenzie

(10) Patent No.: US 6,797,792 B2
(45) Date of Patent: Sep. 28, 2004

(54) LOW CARBON MONOXIDE PROCESS FOR NICKEL CATALYZED OLEFIN POLYMERIZATION

(75) Inventor: Peter B. MacKenzie, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 10/270,584

(22) Filed: Oct. 16, 2002

(65) Prior Publication Data

US 2003/0073791 A1 Apr. 17, 2003

Related U.S. Application Data

(60) Provisional application No. 60/329,517, filed on Oct. 17, 2001.

(51) Int. Cl.$^7$ .............................. C08F 4/44; B01J 31/28
(52) U.S. Cl. ...................... 526/161; 526/171; 526/172; 526/352; 526/901; 502/155; 502/167
(58) Field of Search ................................. 526/161, 171, 526/172, 901, 352; 502/155, 167

(56) References Cited

U.S. PATENT DOCUMENTS 6,506,704 B1 * 1/2003 Bansleben et al. .......... 502/155
6,593,437 B1 * 7/2003 Gonioukh et al. .......... 526/117

FOREIGN PATENT DOCUMENTS

| GB | 837251 | 6/1960 |
| WO | WO 95/21146 A1 | 10/1995 |
| WO | WO 01/77190 A1 | 10/2001 |
| WO | WO 02/32967 A2 | 4/2002 |

OTHER PUBLICATIONS

Panchenko et al., Journal of Molecular Catalysis A: Chemical 135 (1998) 115–120.*
Bukatov et al., Macromol. Chem. Phys. 199, 2473–2476 (1998).*
Steven D. Ittel et al.; Late–Metal Catalysts for Ethylene Homo– and Composition; Chemical Reviews; 2000; pp. 1169–1203; vol. 100, No. 4; American Chemical Society.
Gennadii D. Bukatov et al., "Determination of the Number of Active Centers and of the Propagation Rate Constant for Ethylene Polymerization on Supported Ni–Containing Catalysts by Using $^{14}$CO", *Macromolecular Chemistry and Physics*, vol. 199, No. 11, Nov. 1998, pp. 2473–2476.
Wolfgang Kläui et al., "Novel Nickel(II) Complexes for the Catalytic Copolymerization of Ethylene and Carbon Monoxide: Polyketone Synthesis in Supercritical Carbon Dioxide", *Angewandte Chemistry International Edition*, vol. 39, No. 21, 2000, pp. 3894–3896.
V. N. Panchenko et al., "The IRS–DR Study of Interaction of the Supported Catalyst Based on the Organic Nickel Chelate With Carbon Monoxide and Ethylene", *Journal of Macromolecular Catalysis A: Chemical*, vol. 135, 1998, pp. 115–120.

* cited by examiner

*Primary Examiner*—Robert D. Harlan
(74) *Attorney, Agent, or Firm*—Bernard J. Graves, Jr.; Jonathan D. Wood

(57) ABSTRACT

The use of olefin feedstocks with low carbon monoxide content to achieve improved productivities in nickel catalyzed olefin polymerizations is described.

16 Claims, 3 Drawing Sheets

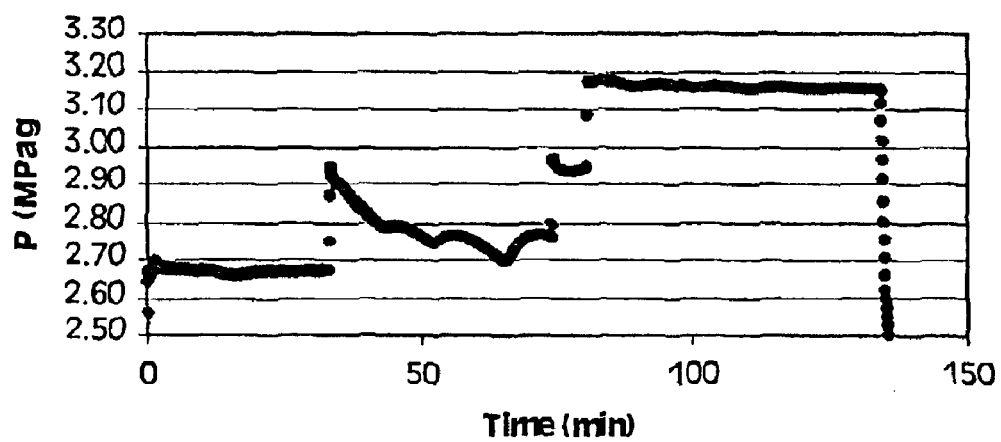

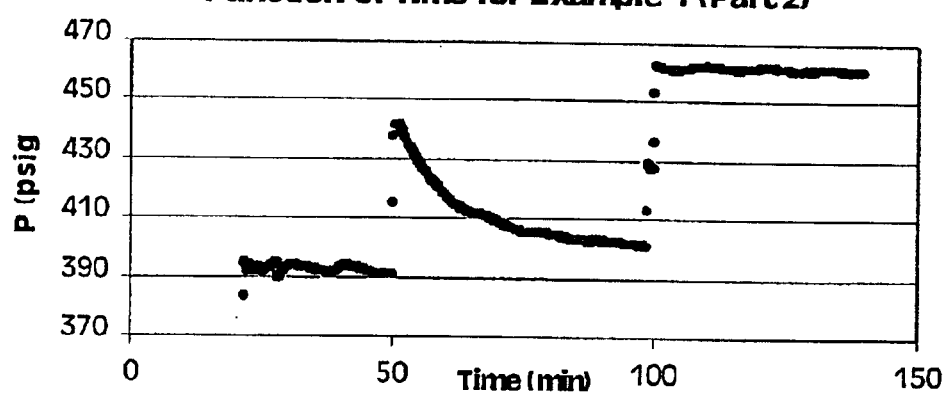

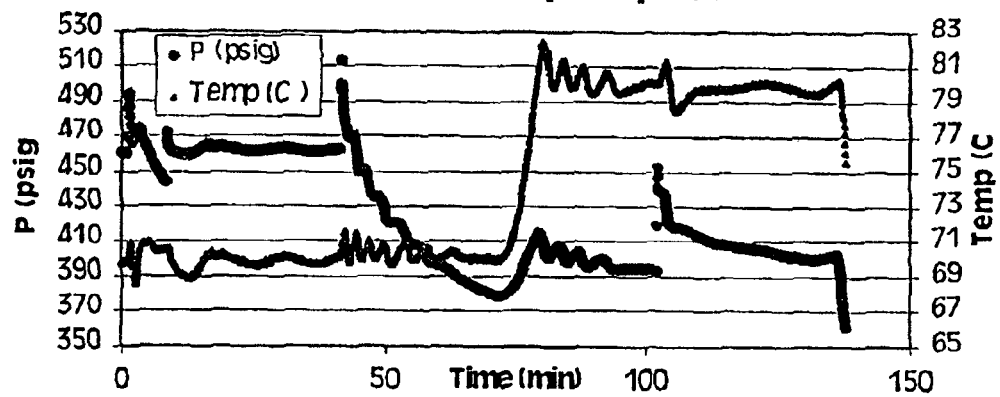
Figure 3. A Graph of Reactor Pressure as a Function of Time for Example 1 (part 3)

LOW CARBON MONOXIDE PROCESS FOR NICKEL CATALYZED OLEFIN POLYMERIZATION

CROSS-REFERENCE TO RELATED APPLICATION

This application claims the benefit of Provisional Application No. 60/329,517 filed on Oct. 17, 2001, under 35 U.S.C. §119(e); the entire content of which is hereby incorporated by reference.

FIELD OF THE INVENTION

The present invention relates to improved processes for the nickel catalyzed polymerization of olefins. These processes employ olefin feeds with very low carbon monoxide content (e.g., less than about 1 ppm, preferably less than about 0.1 ppm) such that the amount of carbon monoxide charged to the polymerization reactor is comparable to or less than the amount of nickel catalyst charged to the reactor.

BACKGROUND OF THE INVENTION

Olefin polymers are used in a wide variety of products, from sheathing for wire and cable to film. Olefin polymers are used, for instance, in injection or compression molding applications, in extruded films or sheeting, as extrusion coatings on paper, for example photographic paper and digital recording paper, and the like. Improvements in catalysts have made it possible to better control polymerization processes and, thus, influence the properties of the bulk material. Increasingly, efforts are being made to tune the physical properties of plastics for lightness, strength, resistance to corrosion, permeability, optical properties, and the like, for particular uses. Chain length, polymer branching and functionality have a significant impact on the physical properties of the polymer. Accordingly, novel catalysts are constantly being sought in attempts to obtain a catalytic process for polymerizing olefins which permits more efficient and better-controlled polymerization of olefins.

Nickel catalysts for olefin polymerization have attracted interest based on their potential utility in generating polyolefins possessing novel microstructures and/or functionality. Both neutral and cationic nickel catalysts have been shown to be more tolerant of polar comonomers or additives than Group 4–6 transition metal catalysts for olefin polymerization (Ittel et al., *Chem. Rev.* 2000, 100, 1169). Neutral nickel catalysts have been shown to effect aqueous emulsion polymerizations (Claverie et al., *Macromolecules* (2001), 34(7), 2022–2026) and to copolymerize ethylene with functional monomers (Grubbs et al., *Science* (2000), 287(5452), 460–462). So-called "naked nickel" cationic complexes have been shown to copolymerize norbornene with functionalized norbornene derivatives (Goodall et al., WO 98/56837). With cationic nickel complexes of bidentate N,N-donor ligands, ethylene has been copolymerized with ethyl undecenoate (Mackenzie et al., WO 99/62968), and polymerizations have been carried out in supercritical carbon dioxide (Brookhart et al., U.S. Pat. No. 5,866,663) and in the presence of millimolar concentrations of 2,6-di-tert-butyl-4-methylphenol (Mackenzie et al., U.S. Provisional Patent Application 60/298,893, filed Jun. $19^{th}$, 2001). In a related vein, it has also been reported that nickel catalyzed ethylene/carbon monoxide alternating copolymerizations proceed in super-critical carbon dioxide (Klaui et al., *Angew. Chem.*, Int. Ed., (2000), 39(21), 3894–3896).

SUMMARY OF THE INVENTION

I have discovered that certain high activity nickel catalysts for olefin polymerization are extremely sensitive to the presence of carbon monoxide and are deactivated by stoichiometric amounts under olefin polymerization conditions. In view of the above cited references which suggest that nickel catalysts are more tolerant of polar comonomers and additives than existing commercial olefin polymerization catalysts, it is surprising and unexpected that such high sensitivities to carbon monoxide should be observed.

I have also found that by reducing the carbon monoxide content of the ethylene, significant improvements in catalyst productivity are observed at low catalyst loadings. Methods for reducing the carbon monoxide content of olefin feed streams are known (Rosenfeld, WO 95/21146). Such methods can be used in the present invention. The ability to achieve higher productivities simply by scrubbing the olefin feed to lower the carbon monoxide content is expected to be useful in achieving better economies in nickel-catalyzed polyolefin production. In the case of neutral nickel catalysts, including those comprising a bidentate N,N-, N,O-, or P,O-donor ligand, those catalysts which give very high activities for olefin polymerization (e.g., greater than about 50 kg polyolefin/g Ni/h) are also expected to be inhibited by carbon monoxide, since the rate of olefin/carbon monoxide copolymerization with such catalysts is likely to be lower than the rate of olefin polymerization. In general, more electrophilic neutral nickel complexes are expected to be more sensitive to inhibition by carbon monoxide than less electrophilic complexes.

In addition to the need to lower the carbon monoxide content in the olefin feed, with very low amounts of catalyst, it may also be necessary in some cases to lower the carbon monoxide content of the hydrogen which is added to control molecular weight. In the case of solution or slurry polymerization processes, it is similarly important that the solvent be low in carbon monoxide, and also low in diene (which can also inhibit the catalyst).

Thus, in a first aspect, this invention relates to a process for the polymerization of olefins, comprising contacting ethylene and optionally one or more alpha-olefins with a catalyst comprising a cationic nickel complex of a bidentate N,N-donor ligand, in the presence of less than about 1 equivalent of carbon monoxide per equivalent of nickel. In a first preferred embodiment, the process is carried out in the presence of less than about 0.5 equivalent of carbon monoxide per equivalent of nickel. In a second preferred embodiment, the process is carried out in the presence of less than about 0.25 equivalent of carbon monoxide per equivalent of nickel.

In a second aspect, this invention relates to a process for the polymerization of olefins, comprising contacting ethylene and optionally one or more alpha-olefins with a catalyst comprising a cationic nickel complex of a bidentate N,N-donor ligand, wherein the ethylene contains less than about 1 ppm carbon monoxide, the total pressure is greater than about 689 kPag (100 psig), wherein kPag refers to kiloPascals gauge pressure, and the temperature is greater than about 60° C. In a first preferred embodiment of this second aspect, the ethylene contains less than about 0.5 ppm carbon monoxide, the total pressure is greater than about 689 kPag (100 psig), and the temperature is greater than about 70° C.

In a third aspect, this invention relates to a process for the polymerization of olefins, comprising contacting ethylene and optionally one or more alpha-olefins with a catalyst comprising a neutral nickel complex of a bidentate N,N-, N,O-, or P,O-donor ligand, in the presence of less than about 1 equivalent of carbon monoxide per equivalent of nickel. In a first preferred embodiment of this third aspect, the process is carried out in the presence of less than about 0.5 equivalent of carbon monoxide per equivalent of nickel. In a second preferred embodiment, the process is carried out in the presence of less than about 0.25 equivalent of carbon monoxide per equivalent of nickel.

In a fourth aspect, this invention relates to a process for the polymerization of olefins, comprising contacting ethylene and optionally one or more alpha-olefins with a catalyst comprising a neutral nickel complex of a bidentate N,N-, N,O-, or P,O-donor ligand, wherein the ethylene contains less than about 1 ppm carbon monoxide, the total pressure is greater than about 689 kPag (100 psig), and the temperature is greater than about 60° C. In a first preferred embodiment of this fourth aspect, the ethylene contains less than about 0.5 ppm carbon monoxide, the total pressure is greater than about 689 kPag (100 psig), and the temperature is greater than about 70° C.

BRIEF SUMMARY OF THE DRAWINGS

FIG. 1 is a graph of reactor pressure as a function of time for Example 1 (Part 1).

FIG. 2 is a graph of reactor pressure as a function of time for Example 1 (Part 2).

FIG. 3 is a graph of reactor pressure as a function of time for Example 1 (Part 3).

EXAMPLES

Example 1

Comparative Example to Show the Effect of Added CO on Ethylene Polymerization Using Catalyst 1a Part 1

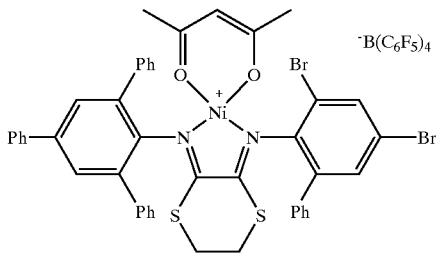

1a

A 1 L Parr autoclave, Model 4520, equipped with a Parr® 4842 Controller and a Cole-Parmer® 0–6.89 MPa (0–1000 psi) pressure transducer, Model 07-35656, was dried by heating under vacuum to 180° C. at 0.6 torr for 1 h, then cooled and refilled with dry nitrogen. The autoclave was charged with dry, deoxygenated hexane (450 mL) and 1.0 mL of a 10 wt % solution of MAO (methyl alumoxane, Aldrich), then sealed and pressurized with ethylene (Air Products, CP Grade) to 1.38 MPag (200 psig), wherein MPag refers to MegaPascals gauge, and depressurized twice. Sufficient hydrogen was added to raise the pressure by 59 kPa (8.6 psi), the reactor was heated to 70° C. and then ethylene was introduced to raise the reactor pressure to ca. 2.41 MPag (350 psig). A sample loop injector was used to inject 2.0 mL of a stock solution, corresponding to 0.25 mol of 1a, prepared from 16.1 mg 1a and 80.5 mL dry, deoxygenated toluene, using ethylene pressure to push the solution into the reactor. This was followed by an injection of 2.0 mL of toluene from a second sample loop to wash any catalyst residues from the first sample loop into the reactor. Sufficient ethylene had been added at this point to raise the total pressure to ca. 2.69 Mpag (390 psig). The reactor was isolated from the ethylene supply and the ethylene pressure was monitored. Very little catalyst activity was observed, as evidenced by the relatively flat pressure vs time curve from t=0 to t=33 min (FIG. 1).

In contrast, a second injection of 0.25 μmol 1a at 33 min resulted in a pronounced pressure drop between t=33 and t=74 min (FIG. 1). These data are consistent with sufficient CO being present in the initially charged ethylene to titrate all or most of the first 0.25 μmol of 1a, after which relatively little poison remained to deactivate the second 0.25 μmol of 1a.

Part 2

The effect of intentionally added CO was then evaluated as follows. A 0.25 mL charge of CO at 1 atm (corresponding to 11 μmol) was injected to the reactor via a 0.25 mL sample loop, with sufficient ethylene being added to raise the total pressure to ca. 2.96 MPag (430 psig). This was followed by a third injection of 0.25 μmol of 1a, resulting in a total pressure of ca. 3.17 MPag (460 psig). As shown by the very slow pressure drop between t=80 and t=134 min (largely attributable to a small leak)(FIG. 1), very little catalyst activity was observed.

The reactor was vented and purged, without opening, with the intention of restarting, by cooling the reactor to room temperature, venting the pressure, then pressurizing to 1.38 MPag (200 psig) with ethylene and venting, twice. Sufficient hydrogen was added to raise the pressure by 45 kPag (6.47 psi), then the reactor was heated to 70° C. pressurized to 2.41 MPag (350 psig), the clock was reset to zero, and 2 injections of 0.25 μmol 1a were made as before at t=22 and 50 min (FIG. 2). As before, very little catalyst activity was observed with the first injection following the restart, while the second injection evinced good activity between t=50 and t=98 min.

At this point, 40 mL of a mixture of 1010 ppm CO in helium at 1 atm (corresponding to 1.8 μmol CO) was injected via sample loop, with sufficient ethylene being added to raise the total pressure to ca. 2.96 MPag (430 psig), after which another 0.25 μmol 1a was injected and the total pressure raised to ca. 3.19 MPag (462 psig). Very little catalyst activity was observed. This shows (1) that CO is a very potent poison for the catalyst, (2) that it acts very rapidly to deactivate the catalyst, and (3) that the large excess of MAO which remains does not react with the deactivated nickel species to reactivate it to any significant extent in the context of this experiment.

Part 3

In order to back-titrate the CO with nickel catalyst, the clock was reset to zero and 1 μmol 1a (from a stock solution of 8.0 mg 1a in 10.0 mL toluene) was injected at 1.2 min. Good catalyst activity was observed until an additional 1.8 umol CO in helium was injected at 8.6 min, after which little or no activity remained (FIG. 3). The CO was subsequently consumed by adding another 1 μmol 1a at 41.5 min, resulting in good activity once again (FIG. 3, t=41.5 to t=70 min). Finally, the temperature was raised to 80° C. and 0.25 μmol 1a was injected at 102.2 min, again resulting in good activity (FIG. 3). In addition to the forementioned implications, these data suggest that the stoichiometry of the deactivation is such that 2 or more CO's are consumed per nickel.

Example 2

Preparation of a CO Scrubbing Column

A 1" diameter, 12" long, thick wall stainless steel tube equipped with valves at both ends was charged with 74 g of a silica supported copper catalyst (Englehard, B894-02 Cu/SiO₂ T1/8) and 14 g of Denstone®. The tube was then heated to 200° C. while flowing a mixture of hydrogen in nitrogen through the tube at 200 mL/min, starting with 5 vol % hydrogen and ramping up to 20 vol % hydrogen over 1 h, then maintaining this level for another 19 h to complete activation.

Example 3

Ethylene Polymerization Using Catalyst 1b (Ar=4-tert-butylphenyl) and CO-scrubbed CP-grade Ethylene

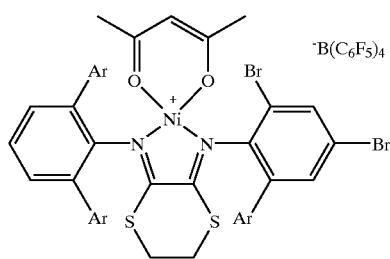

1b

A 1 L Parr autoclave, Model 4520, was dried by heating under vacuum to 180° C. at 0.6 torr for 1 h, then cooled and refilled with dry nitrogen. The autoclave was charged with dry, deoxygenated hexane (450 mL) and 1.0 mL of a 10 wt % solution of MAO (methyl alumoxane, Aldrich). The reactor was sealed and sufficient hydrogen was added to raise the pressure by 39 kPa (5.7 psi). The reactor was heated to 70 C. and ethylene (Air Products, CP grade) was passed through the CO-scrubber from Example 2 at 5.52 MPag (800 psig) and introduced into the reactor at a flow rate of ca. 200 mL/min STP (standard temperature and pressure) via a 0–500 mL/min Brooks mass flow controller, Model 5850E, until the pressure reached approximately 2.86 MPag (415 psig). A sample loop injector was then used to inject 2.0 mL of a stock solution (corresponding to 0.25 mol of 1b) prepared from 8.4 mg 1b and 39.72 mL dry, deoxygenated toluene, using a 500 mL/min STP ethylene flow for 2 min to push the solution into the reactor, after which 2.0 mL of toluene was similarly injected from a second sample loop to wash out the first sample loop. The ethylene flow was maintained at 500 mL/min STP for a total of 10 min, during which time the reactor pressure fell to 2.55 MPag (370 psig). The mass flow controller was shut off, and a small amount of non-scrubber CP-grade ethylene was added to raise the pressure to 2.62 MPag (380 psig). After a total of 36 min, relatively little catalyst activity remained (as judged by the pressure vs time curve) and the reactor was rapidly cooled, depressurized and opened. The polymer product was recovered by filtration and dried in vacuo at ca. 160 C., 10 mm Hg to afford 8.31 g polyethylene (1.2×10⁶ mol ethylene per mol Ni.)

Example 4

Comparative Example Using As-received CP Grade Ethylene

The procedure of Example 3 was repeated without the CO-scrubber to afford 0.72 g polyethylene, corresponding to 1.0×10⁵ mol ethylene per mol Ni.

I claim:

1. A process for the polymerization of olefins, comprising contacting ethylene and optionally one or more alpha-olefins with a catalyst comprising a cationic nickel complex of a bidentate N,N-donor ligand, in the presence of less than about 1 equivalent of carbon monoxide per equivalent of nickel.

2. The process according to claim 1, which is carried out in the presence of less than about 0.5 equivalent of carbon monoxide per equivalent of nickel.

3. The process according to claim 2, which is carried out in the presence of less than about 0.25 equivalent of carbon monoxide per equivalent of nickel.

4. A process for the polymerization of olefins, comprising contacting ethylene and optionally one or more alpha-olefins with a catalyst comprising a cationic nickel complex of a bidentate N,N-donor ligand, wherein the ethylene contains less than about 1 ppm carbon monoxide, the total pressure is greater than about 689 kPag (100 psig), and the temperature is greater than about 60° C.

5. The process according to claim 4, wherein the ethylene contains less than about 0.5 ppm carbon monoxide, the total pressure is greater than about 689 kPag (100 psig), and the temperature is greater than about 70° C.

6. The process according to claim 5, wherein the total pressure is greater than about 2.41 MPag (350 psig) and the ethylene contains less than about 0.25 ppm carbon monoxide.

7. The process according to claim 6, wherein the total pressure is greater than about 4.83 MPag (700 psig) and the ethylene contains less than about 0.1 ppm carbon monoxide.

8. The process according to claim 7, wherein the total pressure is greater than about 9.65 MPag (1400 psig) and the ethylene contains less than about 0.05 ppm carbon monoxide.

9. A process for the polymerization of olefins, comprising contacting ethylene and optionally one or more alpha-olefins with a catalyst comprising a neutral nickel complex of a bidentate N,N-, N,O-, or P,O-donor ligand, in the presence of less than about 1 equivalent of carbon monoxide per equivalent of nickel.

10. The process according to claim 9, which is carried out in the presence of less than about 0.5 equivalent of carbon monoxide per equivalent of nickel.

11. The process according to claim 10, which is carried out in the presence of less than about 0.25 equivalent of carbon monoxide per equivalent of nickel.

12. A process for the polymerization of olefins, comprising contacting ethylene and optionally one or more alpha-olefins with a catalyst comprising a neutral nickel complex of a bidentate N,N-, N,O-, or P,O-donor ligand, wherein the ethylene contains less than about 1 ppm carbon monoxide, the total pressure is greater than about 689 kPag (100 psig), and the temperature is greater than about 60° C.

13. The process according to claim 12, wherein the ethylene contains less than about 0.5 ppm carbon monoxide, the total pressure is greater than about 689 kPag (100 psig), and the temperature is greater than about 70° C.

14. The process according to claim 13, wherein the total pressure is greater than about 2.41 MPag (350 psig) and the ethylene contains less than about 0.25 ppm carbon monoxide.

15. The process according to claim 14, wherein the total pressure is greater than about 4.83 MPag (700 psig) and the ethylene contains less than about 0.1 ppm carbon monoxide.

16. The process according to claim 15, wherein the total pressure is greater than about 9.65 MPag (1400 psig) and the ethylene contains less than about 0.05 ppm carbon monoxide.

* * * * *